United States Patent [19]
Wang

[11] Patent Number: 5,113,672
[45] Date of Patent: May 19, 1992

[54] AUTOMOBILE STEERING LOCK

[76] Inventor: Ching-Rong Wang, No. 27, Alley 74, Lane 313, Wen-Hsien Road, Tainan, Taiwan

[21] Appl. No.: 726,694

[22] Filed: Jul. 8, 1991

Related U.S. Application Data

[63] Continuation-in-part of Ser. No. 664,802, Mar. 5, 1991.

[51] Int. Cl.$^5$ .............................................. B60R 25/02
[52] U.S. Cl. ........................................ 70/209; 70/211; 70/226
[58] Field of Search ............... 70/209, 211, 212, 225, 70/226, 237, 238, 239, 38 C, 53

[56] References Cited

U.S. PATENT DOCUMENTS

| | | | |
|---|---|---|---|
| 1,160,433 | 11/1915 | Mitiski | 70/38 C |
| 4,848,110 | 7/1989 | Kuo | 70/238 |
| 5,005,388 | 4/1991 | Lo | 70/226 |
| 5,022,246 | 6/1991 | Wang | 70/226 |
| 5,042,278 | 8/1991 | Wang | 70/209 |
| 5,062,282 | 12/1991 | Rong | 70/209 |

Primary Examiner—Renee S. Luebke
Assistant Examiner—Darnell M. Boucher
Attorney, Agent, or Firm—Bacon & Thomas

[57] ABSTRACT

An automobile steering lock comprising an elongated tubular body member, an elongated rod member to move in telescopic manner in the body member, a housing formed around one end portion of the body member for accommodating a locking mechanism and two biasing springs and two rod-like bearings, a plurality of first annular grooves in the middle portion of the rod member and two second and third annular grooves near one end of the rod member, the second and third annular grooves being engageable by tenons of the rod like bearings biased by the springs to prevent the rod member from wholly slipping out of the body member when the rod member is pulled out of the body member in adjusting the length of the lock to attach it on a steering wheel of a car.

1 Claim, 6 Drawing Sheets

AUTOMOBILE STEERING LOCK

CROSS REFERENCE TO RELATED APPLICATION

This application is a continuation-in-part of application Ser. No. 664,802 filed on Mar. 5, 1991.

BACKGROUND OF THE INVENTION

A conventional automobile steering lock shown in FIG. 1 comprises a second annular groove 11 near the end of a rod member 10 for one of two tenons of two rod-like bearings 12, 13 to fit in when the rod member 10 is pulled outward within a tubular body member 14 in adjusting the length of the lock, in order to prevent the rod member 10 from completely slipping out of the body member 14. But in use, this lock has defects as follows.

1. The groove 11 has two vertical walls for the tenon of one of two rod-like bearings to fit in, so it should have a little larger width than that of the tenon so that said tenon cannot fit in said groove 11 very tightly, but rather loosely and unstabilized.

2. The groove 11 has no guide sloped wall to guide the tenon of the rod-like bearing 13 or 12 to slide down to fit therein so that said tenon may not fall into said groove 11 if the rod member 10 is pulled outward too quickly, and the result may be that the rod member 10 can wholly slip out of the body member 14 and may hurt a person or a thing nearby.

SUMMARY OF THE INVENTION

The automobile steering lock in the present invention has been improved to have the following advantages and functions.

1. Two locating means or rod-like bearings have bottom tenons to slide along on left-side guide sloped walls of two second and third annular grooves near the end of the rod member so that the tenons can surely drop down to fit into said grooves.

2. If the two tenons drop to fit into the second and third annular grooves, they can be more securely held in said grooves, because two sloped walls of the bottom tenons can fit with the slide sloped wall of the second groove and the sloped wall of the third groove, and the right vertical wall of said right bearing can fit with the right vertical wall of said third groove.

3. The tenons can drop down without fail into the second and third annular grooves so that the rod member can be prevented from slipping wholly out of the body member.

DETAILED DESCRIPTION OF THE INVENTION

Figure 1:
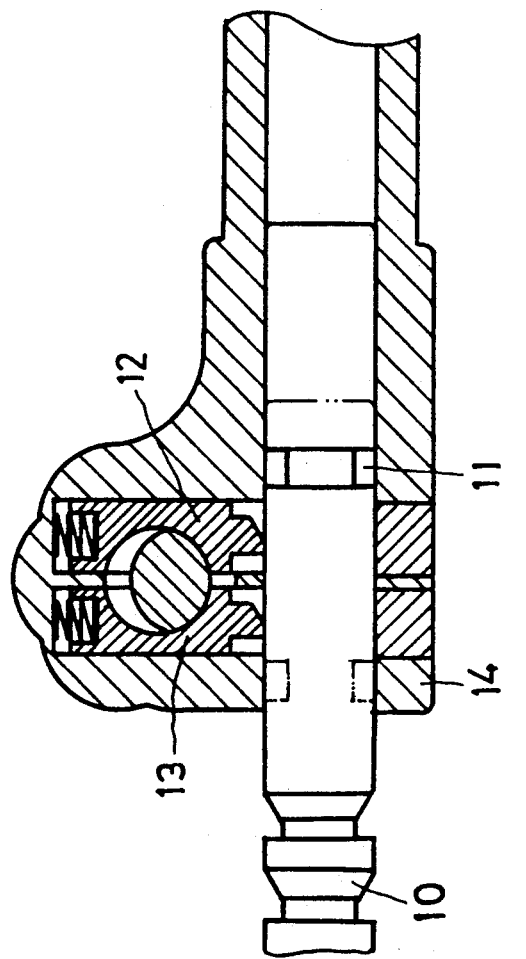
FIG. 1 is a part cross-sectional view of a conventional automobile steering lock.
Figure 2:
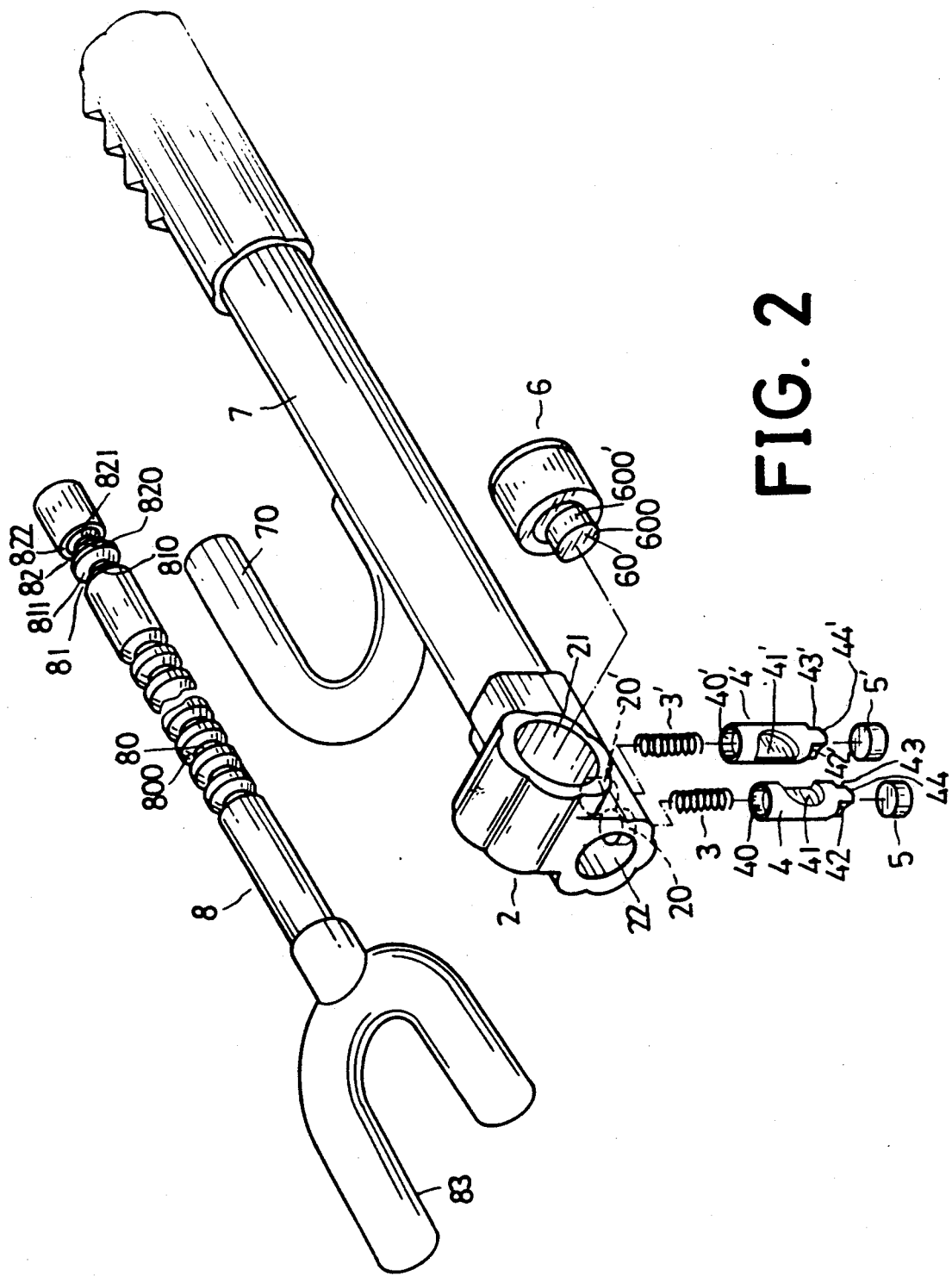
FIG. 2 is an exploded perspective view of an automobile steering lock in the present invention.
Figure 3:
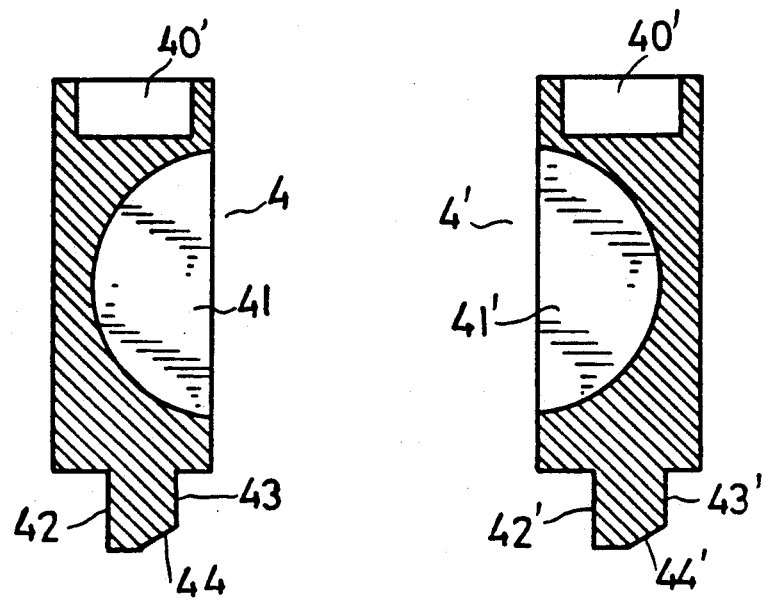
FIG. 3 is a side cross-sectional view of the two rod-like bearings in the automobile steering lock in the present invention.
Figure 4:
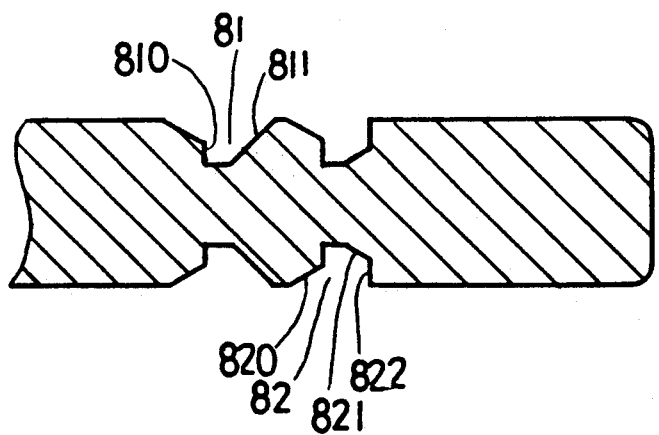
FIG. 4 is a cross-sectional view of two second annular grooves near the end of the rod member in the present invention.
Figure 5:
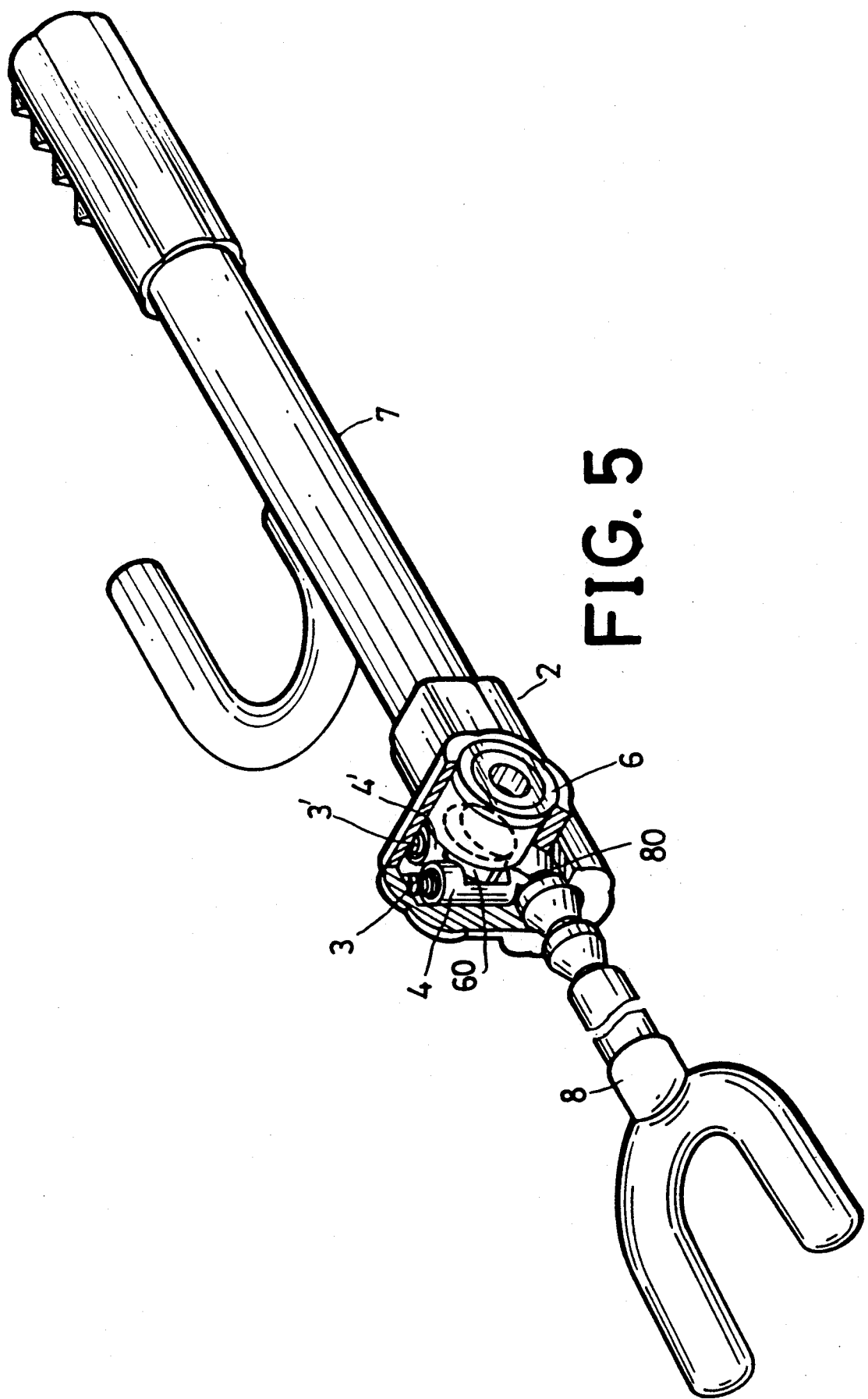
FIG. 5 is a part cross-sectional view of the automobile steering lock in the present invention.

The automobile steering lock in the present invention, as shown in FIG. 2, comprises an elongated body member 7, an elongated rod member 8 which is positioned to move in telescopic fashion within the body member 7, hooks 70, 83 for engaging opposed portion of a steering wheel from the inside thereof, being respectively provided on the body member 7 and the rod member 8, a housing 2 and a locking mechanism including a locking means 6 and locating means 3, 4 being provided within the housing 2.

The housing 2 is formed around an end portion of the body member 7 to form an integral structure therewith wherein the central passage extends therethrough and contains the locking mechanism including the locking means 6 and locating means 3, 4.

The housing 2 has two bores 20, 20' in the bottom, a transverse bore 21 for firmly receiving the locking means 6 which has a locking member 60 of a cylindrical shape. The locking member 60 has two arcuate outer faces 600, 600'. Two biasing springs (locating means) 3, 3' and two first and second rod-like bearings (locating means) 4, 4', respectively, are placed in the bores 20, 20', with the top ends of the springs 3, 3' resting on the top of the bore 21 and with the bottom ends of the springs 3, 3' resting on the bottom of the openings 40, 40' in the rod-like bearing 4, 4'. The rod-like bearings 4, 4' are provided with semi-circular grooves 41, 41' on their opposed sides for a locking member 60 of the locking means 6 to fit therein, and tenons at their bottoms. The tenons have inclined faces 44, 44' at their right side bottoms and opposed vertical faces 42, 42', 43, 43'. Two metal discs 5, 5' are fixed in the bottoms of the bores 20, 20' for retaining the biasing springs 3, 3' and the rod-like bearings 4, 4' in the bores 20, 20'. The locking means 6 is fitted in the bore 21, having at its axial bottom a locking member 60 fitting in the semi-circular grooves 41, 41' of the locating means 4, 4', and the locking members 60 has two curved faces 600, 600'.

The elongated body member 7 is in the form of an elongated tube having a circular end portion and defining a central passage running through the body member 7. The U-shaped hook 70 is fixed securely to the body member 7 by means of welding adjacent the end portion such that it opens rearwardly along the body member 7.

The rod member 8 includes an elongated rod of circular cross-section of which the outer diameter is dimensioned slightly less than the diameter of the central passage of the body member 7 to enable the rod to telescope freely within the body member 7. A plurality of first annular grooves 80 axially spaced are circumferentially provided along a major portion of the rod. Each of the annular grooves 80 has a convex or sloped side wall 800 positioned closes from the hook 83 and a vertical side wall perpendicular to the longitudinal direction of the rod and positioned closes to the hook 83, which is fixed securely at the front end of the rod such that it opens opposite to the hook 70 for engagement with a diametrically opposed portion of steering wheel.

Figure 6:
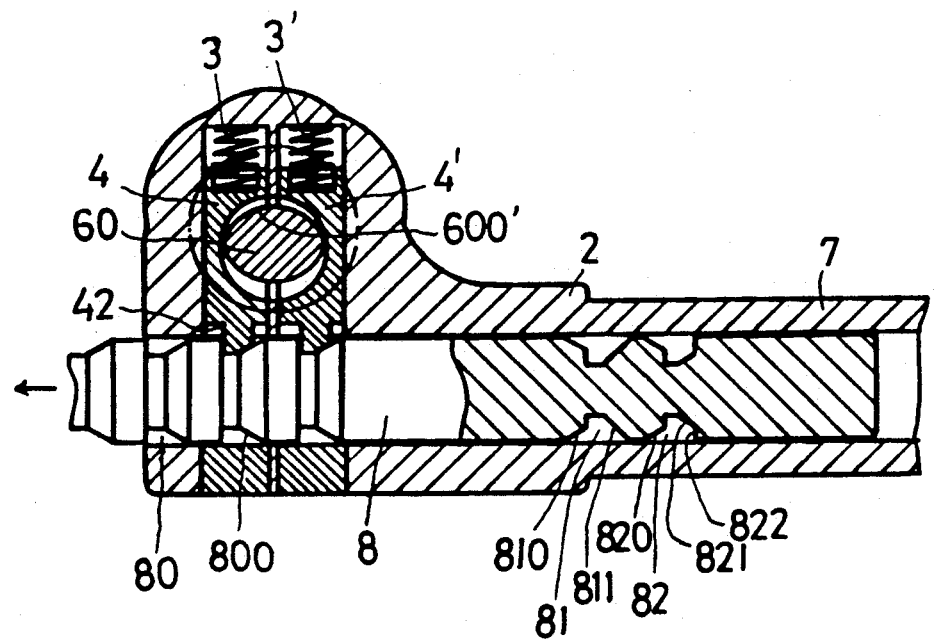
FIG. 6 is a cross-sectional view of the locking mechanism combined with the rod member in the present invention.
Figure 7:
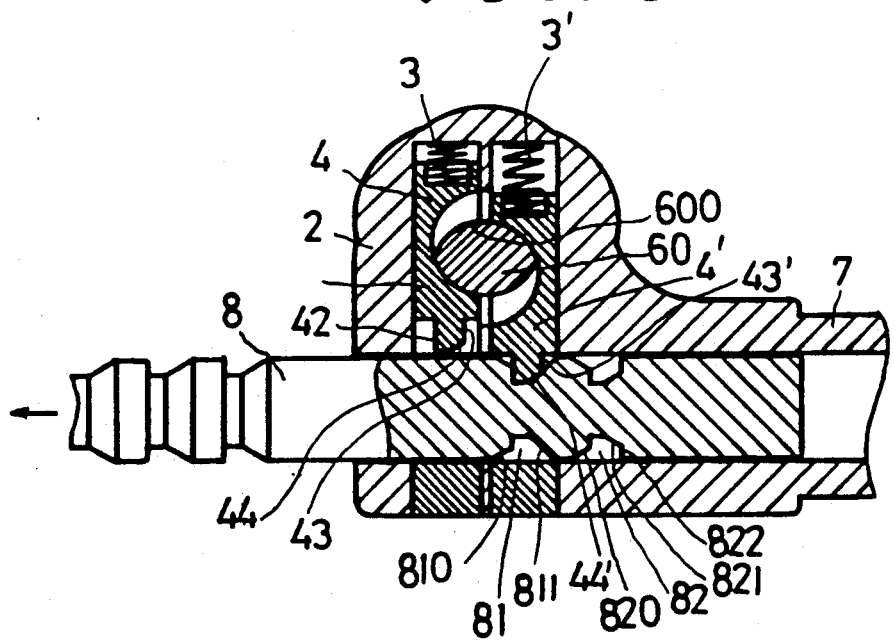
FIG. 7 is a cross-sectional view of the right rod-like bearing fitting in one of the two second annular grooves in the present invention.
Figure 8:
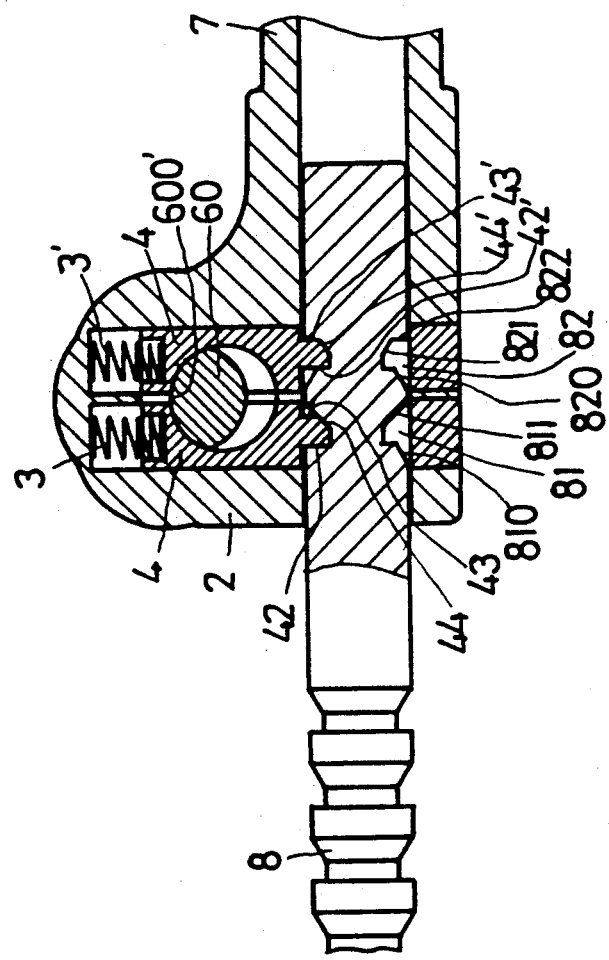
FIG. 8 is a cross-sectional view of the two rod-like bearings fitting in the two second annular grooves in the present invention.

When the locking means 6 is accomodated in the housing 2, the curved face 600' of the locking member 60 of the locking means 6 engages the upper sections of the semi-circular grooves 41, 41' of the rod-like bearings 4, 4' being pushed downward by the biasing springs 3, 3' such that the locking member 60 is located at the lowest point in the locking means 6 and the rod-like bearings 4, 4' are at the lowest position, having their bottom tenons fitting in two of the annular gooves 80 of the rod member 8, as shown in FIG. 6.

In operation, when the rod member 8 is pulled outward in the central passage of the body member 7, the sloped side walls 800 of the first annular grooves 80 can slide along on the inclined faces 44, 44' on the rod-like bearings 4, 4', enabling the rod member 8 to extend outward freely. If one of the rod-like bearings 4, 4' should fall into one of the second and third annular grooves 81 and 82 when the rod member 8 is pulled, the tenon of said bearing 4' can be guided by the guide sloped wall 810 of the annular groove 81 to fit into said groove 81. But the inclined face 44' can be guided by the slide sloped wall 811 so that the tenon 4' can continue to slide on the guide sloped wall 820 to fit into the third annular groove 82 and be stopped by the vertical wall 822 blocking the vertical wall 43'. Then the two tenons of the rod-like bearings 4, 4' become immovably engaged within the two annular grooves 81, 82. Therefore, even if the rod member is pulled with excessive force, the vertical wall 822 can finally block the vertical wall 43' of the tenon of the rod-like bearing 4' so that the rod member 8 can never be pulled wholly out of the body member 7 to prevent any possible accident. So provision of the second and third annular grooves 81, 82 has a safety purpose to prevent possible accidents.

In order to push the rod member 8 inwardly in the body member 7, a correct key must be used to rotate the locking means 6 for 180 degrees to turn upward the curved face 600 of the locking member 60 and to push upwardly in order to release the rod-like bearings 4, 4' from the second and third annular grooves 81, 82. Then the rod member 8 can be pushed inward in the body member 7 without blocking by the rod-like bearings 4, 4'. Under this condition, the biasing springs 3, 3' are in compressed state, and then if the locking means 6 is further rotated by the correct key for 180, rotating the curved face 600 down, the rod-like bearings 4, 4' are then pushed down by the biasing springs 3, 3' to fit in two of the annular grooves 80 of the rod member 8, preventing the rod member 8 from further inward movement, thereby locking the lock.

What is claimed is:

1. An automobile steering lock comprising:
a) an elongate tubular member including an inner end, an outer end and an elongate passageway extending longitudinally therethrough, and a first U-shaped hook secured to the tubular member substantially midway between the inner and outer ends;
b) a housing secured around the inner end of the tubular member, the housing including two vertical bores extending through a bottom of the housing and a transverse bore communicating with the elongate passageway of the tubular member;
c) a locking mechanism disposed in the transverse bore of the housing and including a locking member and first and second locating means disposed in the vertical bores, each locating means including a rod-like bearing provided with a tenon at a bottom end thereof and a spring biasing the bearing towards the elongate passageway of the tubular member;
d) each bearing including a semi-circular groove and each tenon being provided with an inclined face and a pair of opposed vertical faces, wherein the locking member is engaged within the semi-circular grooves;
e) an elongate rod member having an inner end and an outer end, the inner end of the rod member being receivable within the elongate passageway of the tubular member to permit the rod member to extend and retract in a telescopic manner within the passageway, and a second U-shaped hook secured to the outer end of the rod member;
f) the rod member further including a plurality of first annular grooves longitudinally spaced along the rod member and circumferentially formed therein, each first annular groove being defined by a vertical wall positioned closer to the second U-shaped hook and a sloping sidewall positioned farther from the second U-shaped hook, and second and third annular grooves circumferentially formed in the rod member adjacent the inner end thereof, the third annular groove being positioned between the second annular groove and the inner end of the rod member, the second annular groove being defined in sequence by a downwardly sloping wall, a vertical wall, a flat bottom wall and an upwardly sloping wall, and the third annular groove being defined in sequence by a downwardly sloping wall, a first vertical wall, a flat bottom wall, an upwardly sloping wall and a second vertical wall; and
g) when the rod member is extended outwardly of the tubular member for a sufficient distance, the tenons of the bearings are disposed into engagement within the second and third annular grooves such that the inclined face of the tenon in the third annular groove engages the upwardly sloping wall of the third annular groove and a vertical face of the tenon engages the second vertical wall of the third annular groove, thereby preventing the rod member from being entirely removed from the tubular member.

* * * * *